United States Patent
Lee et al.

(10) Patent No.: US 10,248,259 B2
(45) Date of Patent: Apr. 2, 2019

(54) OBJECT IDENTIFICATION METHOD OF TOUCH SYSTEM

(71) Applicants: IMAGINATION BROADWAY LTD., New Taipei (TW); SALT International Corp., New Taipei (TW)

(72) Inventors: Shang-Li Lee, New Taipei (TW); Zong-Bin Liao, New Taipei (TW); Ko-Hao Ting, New Taipei (TW)

(73) Assignees: IMAGINATION BROADWAY LTD., New Taipei (TW); SALT INTERNATIONAL CORP., New Taipei (TW)

( * ) Notice: Subject to any disclaimer, the term of this patent is extended or adjusted under 35 U.S.C. 154(b) by 0 days.

(21) Appl. No.: 15/475,373

(22) Filed: Mar. 31, 2017

(65) Prior Publication Data
US 2017/0285867 A1 Oct. 5, 2017

(30) Foreign Application Priority Data
Apr. 1, 2016 (TW) .............................. 105110536 A

(51) Int. Cl.
*G06F 3/041* (2006.01)
*G06F 3/044* (2006.01)
*G09G 5/00* (2006.01)

(52) U.S. Cl.
CPC ............. *G06F 3/0418* (2013.01); *G06F 3/044* (2013.01); *G06F 2203/04112* (2013.01); *G09G 5/003* (2013.01)

(58) Field of Classification Search
CPC .................. G06F 3/0418; G06F 3/044; G06F 2203/04112; G09G 5/003
See application file for complete search history.

(56) References Cited

U.S. PATENT DOCUMENTS

| | | | |
|---|---|---|---|
| 8,773,146 B1* | 7/2014 | Hills ...................... | G01N 27/22 324/658 |
| 8,982,097 B1* | 3/2015 | Kuzo ................... | G06F 3/0418 345/174 |
| 9,256,319 B2* | 2/2016 | Nakajima .............. | G06F 3/044 |
| 9,310,950 B2* | 4/2016 | Takano .................. | G06F 3/044 |
| 9,652,078 B2* | 5/2017 | Tsuyuzaki ............. | G06F 3/0418 |
| 9,684,418 B1* | 6/2017 | Hills ...................... | G01N 27/22 |
| 9,727,197 B2* | 8/2017 | Takano .................. | G06F 3/044 |
| 2012/0050214 A1* | 3/2012 | Kremin ................. | G06F 3/0418 345/174 |
| 2013/0141387 A1* | 6/2013 | Royhob ................. | G06F 3/044 345/174 |
| 2013/0176268 A1* | 7/2013 | Li .......................... | G06F 3/044 345/174 |

(Continued)

*Primary Examiner* — Jose R Soto Lopez
(74) *Attorney, Agent, or Firm* — WPAT, PC

(57) ABSTRACT

An object identification method of touch system is disclosed. The object identification method includes: repeating an object measurement to obtain a plurality of object signals; conducting a liquid measurement to obtain a liquid signal; determining whether the value of the liquid signal is greater than a first default value or less than a second default value, wherein the first default value is larger than the second default value; proceeding with an elimination step if the value of the liquid signal is greater than the first default value; and, proceeding with a start step if the value of the liquid signal is less than the second default value.

9 Claims, 4 Drawing Sheets

(56) References Cited

U.S. PATENT DOCUMENTS

| | | | |
|---|---|---|---|
| 2013/0207935 A1* | 8/2013 | Toda | G06F 3/0418 345/174 |
| 2013/0278543 A1* | 10/2013 | Hsu | G06F 3/044 345/174 |
| 2014/0198064 A1* | 7/2014 | Kim | G06F 3/0418 345/173 |
| 2015/0185919 A1* | 7/2015 | Chang | G06F 3/044 345/174 |
| 2015/0346903 A1* | 12/2015 | O'Connor | G09G 5/003 345/173 |
| 2016/0266717 A1* | 9/2016 | Oral | G06F 3/0418 |
| 2016/0357340 A1* | 12/2016 | Ma | G06F 3/0418 |
| 2017/0131841 A1* | 5/2017 | Chang | G06F 3/0418 |

* cited by examiner

OBJECT IDENTIFICATION METHOD OF TOUCH SYSTEM

CROSS-REFERENCE TO RELATED APPLICATIONS

This application claims the benefit of priority to Taiwan patent application Ser. No. 105110536 entitled "OBJECT IDENTIFICATION METHOD OF TOUCH SYSTEM", filed Apr. 1, 2016, which is also incorporated herein by reference.

FIELD OF THE INVENTION

The present invention pertains to an identification method of touch system, and particularly relates to an object identification method for avoiding to mistake a liquid signal for an object signal.

BACKGROUND OF THE INVENTION

A touch panel or touch screen is one of the major interfaces between human and machine, and as a recognition device, can ingeniously combine input and display interfaces, and therefore has the advantages of saving device space and user-friendly operation. Nowadays it has been generally applied to a wide variety of consuming or industrial electronic products. For example, PDAs (Personal Digital Assistant), palm-sized PCs (Personal Computers), tablet computers, mobile phones, handwriting input devices for a smart phone, IAs (Information Appliances), ATMs (Automated Teller Machines) and POS (Points-of-Sale), etc., which can generally be seen in various occasions of business and industry applications.

Especially when the projected capacitive (PCI or PCAP) touch technology integrated in said electronic products, no matter that the outdoor or portable PCI electronic products may come into contact with liquid such as rain or spilled beverages. For example, the new treadmill incorporate PCI touch panels, runners' sweat will contaminate the touch surface; PCI systems used on oceangoing vessels may be splashed with seawater; or, PCI touch panels utilized in the medial field will have to endure saline, blood, and other liquids.

One of the challenges frequently encountered by PCI touch panel applications is the difficulty of obtaining a reliable object signal (touch signal) when liquid is present on the touch surface. Projected capacitive touch sensing relies on the interpretation of minute changes in electromagnetic fields projected by capacitors embedded in the touch surface caused by the interaction of conductors such as a finger or a touch pen with these fields. Therefore, water, dishwashing liquid, saline (0.9% NaCl), blood (0.9% salinity), and even saltwater (3.5% salinity), which are conductor, will cause false touch signals when present on the touch surface. How to effectively determine the false touch signal caused by liquid from interfering the object identification result is the most important issue in touch technology.

SUMMARY OF THE PRESENT INVENTION

The present invention provides an object identification method for avoiding to mistake a liquid signal, which is caused by the interaction of liquid such as water, saline, blood, etc., for an object signal, which is caused by the interaction of finger or touch pen. By inserting a liquid measurement into a cycle of object measurement, the object signals is eliminated from the obtained signals when a liquid signal is confirmed. An elimination step is proceeded until there is no more liquid signal, and a start step is proceeded after that.

In order to achieve one, some or all of the above stated objectives or others, an object identification method of touch system is disclosed. The touch system has at least one driving electrode and at least one sensing electrode.

The identification method comprises: repeating an object measurement to obtain a plurality of object signals; conducting a liquid measurement, and the liquid measurement comprising: driving one or a part of the sensing electrodes to a first voltage; and, measuring electrical changes of the other sensing electrodes, which are not driven, by an analog-to-digital converter to obtain a liquid signal; determining whether the value of the liquid signal is greater than a first default value or less than a second default value, wherein the first default value is larger than the second default value;

Proceeding with an elimination step if the value of the liquid signal is greater than the first default value, wherein the elimination step comprising: repeating the liquid measurement to obtain a plurality of the liquid signals; conducting a noise measurement if the values of the liquid signals are greater than the first default value; repeating the liquid measurement if there is no noise signal obtained by the noise measurement, and determining whether the value of the liquid signals are greater than the first default value; and, eliminating the object signals if the value of the liquid signals are greater than the first default value;

Proceeding with a start step if the value of the liquid signal is less than the second default value, wherein the start step comprising: repeating the liquid measurement to obtain a plurality of the liquid signals; and, starting the object measurement to output the object signals if the liquid signals are less than the second default value.

In a preferred embodiment, before conducting the object measurement, the identification method further comprises: initializing the driving electrode and the sensing electrode so that both of the driving electrode and the sensing electrode are in a grounding state; coupling the sensing electrode to a charge holding capacitor circuit; switching the sensing electrode to a floating state; after the charging process of the charge holding capacitor circuit is done, charging the sensing electrode by the charge holding capacitor circuit; switching the driving electrode to an initial voltage; and, disconnecting the charge holding capacitor circuit and the sensing electrode after the balance of potential is completed, and measuring the charge holding capacitor circuit by the analog to digital converter to obtain an initial signal. Though a process of calculating the initial signal and the object signals, a touch signal is obtained by a controlling unit.

In a preferred embodiment, the object measurement comprising: switching the driving electrode to a first voltage or a second voltage according to a switching mode, the switching mode depends on the back-end filter, wherein the first voltage is less than the second voltage; coupling the sensing electrode to the charge holding capacitor circuit; and disconnecting the charge holding capacitor circuit and the sensing electrode after the balance of potential is completed, and measuring the charge holding capacitor circuit by the analog to digital converter to obtain one of the object signals.

In a preferred embodiment, the number of conducting the object measurement is greater than the number of conducting the liquid measurement.

In a preferred embodiment, a process of debouncing period is though after or before conducting the liquid measurement, to make sure the residual charges on the sensing electrode is released so the liquid measurement can be steady conducted.

In a preferred embodiment, further comprises: eliminating the liquid signals if there is any noise signal obtained by the noise measurement; conducting a frequency-hopping step; conducting the liquid measurement to obtain a plurality of new liquid signals according to the frequency of the frequency-hopping step; and, determining whether the value of the new liquid signal is greater than the first default value or less than the second default value.

In a preferred embodiment, the initial voltage is any voltage above 0V, the first voltage is from 0V to 5V, and the second voltage is from 5V to 18V.

DETAILED DESCRIPTION OF THE INVENTION

The present invention can be more fully understood by reading the following detailed description of the preferred embodiments, with reference made to the accompanying drawings. It is to be understood that both the foregoing general description and the following detailed description are exemplary and explanatory only and are not restrictive of the invention, as claimed. It should be noted that, as used in the specification and the appended claims, the singular forms "a", "an" and "the" include plural referents unless the context clearly dictates otherwise. References cited herein are hereby incorporated by reference in their entirety, except to the extent that they conflict with teachings explicitly set forth in this specification.

Figure 1:
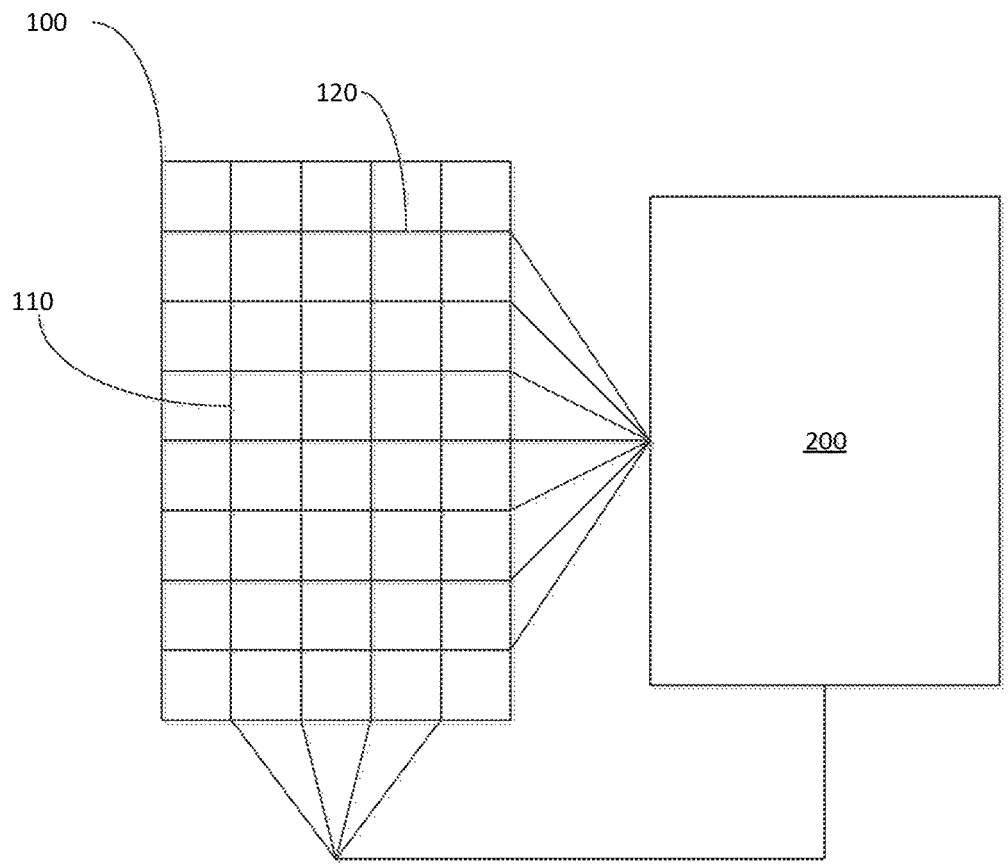
FIG. 1 depicts a schematic diagram of a touch system according to an embodiment of the present invention.

Please refer to FIG. 1, FIG. 1 shows a schematic diagram of a touch system including a touch panel 100 and a detection circuit 200 thereof according to an embodiment of the present invention. The touch panel 100 includes but not limited to a projected capacitive touch panel, and includes at least one driving electrode 110 and at least one sensing electrode 120. The driving electrode 110 and the sensing electrode 120 are made of conductive materials in matrix and the sensing electrode 120 is above the driving electrode 110. The driving electrode 110 is made of stripes in rows, the sensing electrode 120 is made of strips in lines. The capacitive touch panel 100 with matrix structure electrically couples with the detection circuit 200 to perform touch control function.

Figure 2:
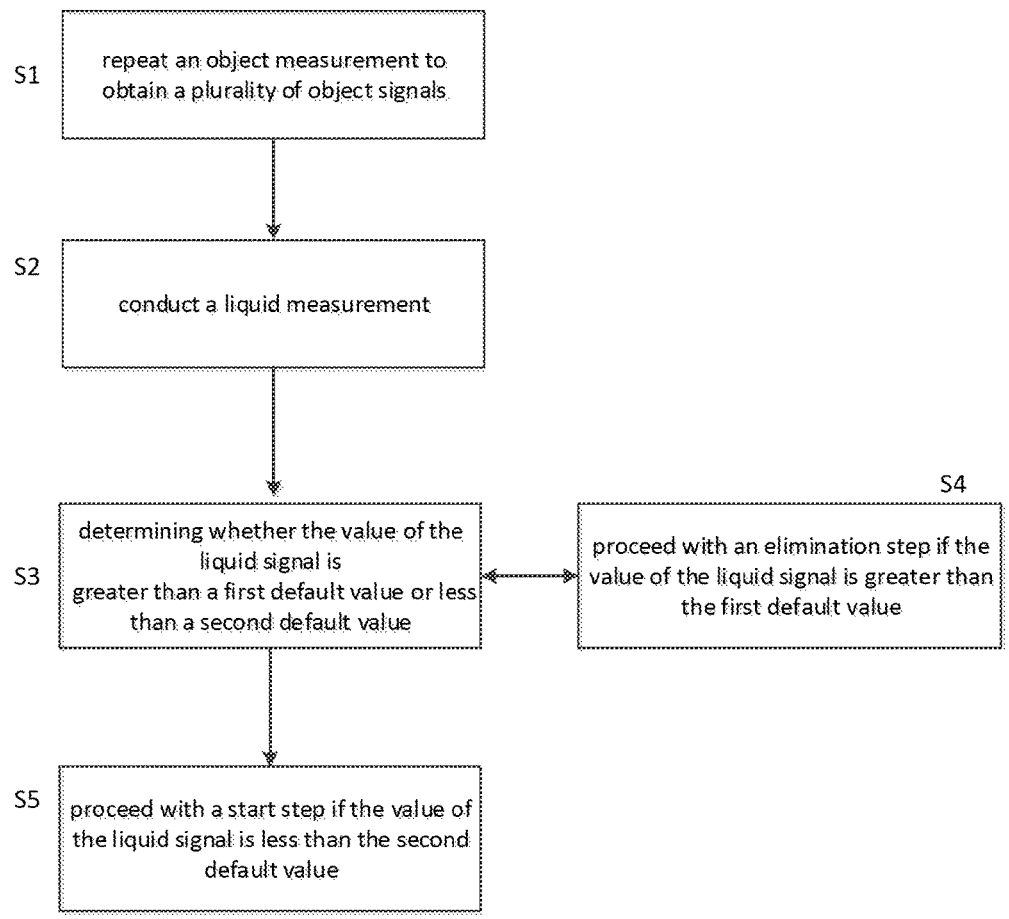
FIG. 2 depicts a flow chart of the object identification method of touch system according to an embodiment of the present invention.

FIG. 2 depicts a flow chart of the object identification method of touch system according to an embodiment of the present invention. The object identification method is implemented by the detection circuit 200, and includes steps S1-S5, S5a and S5b.

Figures 3, 3A:
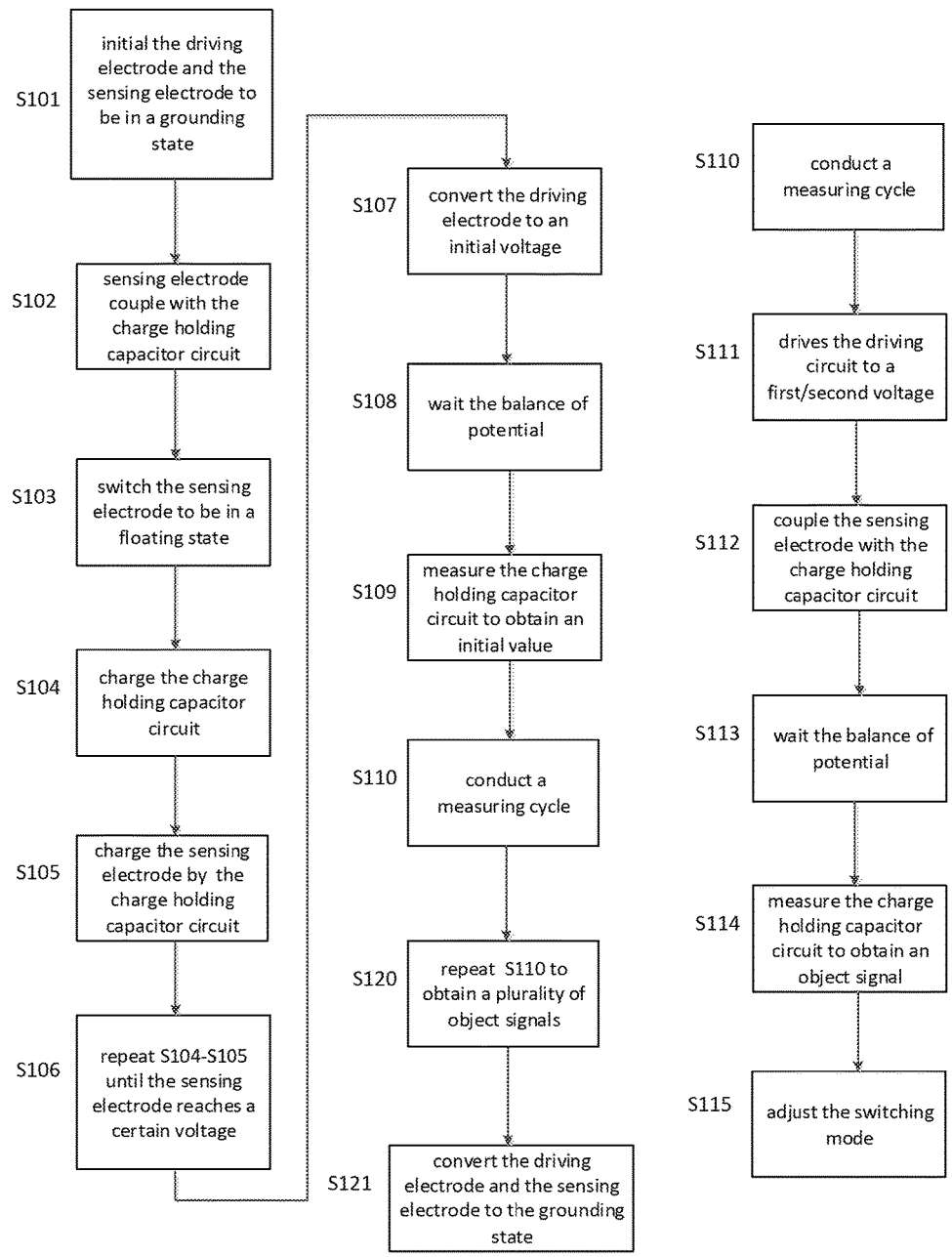
FIG. 3 and FIG. 3A depict flow charts of an object measurement according to an embodiment of the present invention.

Step S1: repeat an object measurement to obtain a plurality of object signals. FIG. 3 and FIG. 3A show flow charts of the object measurement and a measurement cycle thereof.

The object measurement of the present invention includes three phases, the first phase is a starting process which comprises steps of S101-S109, the second phase is a loop process which comprises steps of S110-S120, and the third phase is an ending process which comprises steps of S110-S121. The steps includes the following.

Step S101: The controlling unit of the detection circuit 200 initializes the driving electrode 110 and the sensing electrode 120 so that both of the driving electrode 110 and the sensing electrode 120 are in a grounding state. Residual charges on the driving electrode 110 and the sensing electrode 120 is cleared as the driving electrode 110 and the sensing electrode 120 are in a grounding state.

Step S102: The controlling unit controls that the sensing electrode 120 is coupled with the charge holding capacitor circuit.

Step S103: Through a first debouncing period, the sensing electrode 120 is switched to be in a floating state by the controlling unit while the driving electrode 110 is still in a grounding state.

Step S104: The controlling unit controls a charging circuit to couple with the charge holding capacitor circuit for charging the charge holding capacitor circuit in a certain charging voltage $V_c$.

Step S105: Next, the controlling unit controls the charge holding capacitor circuit to charge the sensing electrode 120.

Step S106: Repeat the steps S104-S105 until the sensing electrode 120 reaches a certain voltage. The certain voltage includes the average value of the charging voltage $V_c$ provided for the charging circuit or the half $V_c/2$.

Step S107: The controlling unit controls the driving circuit to convert the driving electrode 110 from grounding state to the state of providing an initial voltage $V_H$.

Step S108: The electric charges on the driving electrode 110 and the sensing electrode 120 remains stable though a second debouncing period while the balance of potential is completed.

Step S109: The charge holding capacitor circuit disconnects with the sensing electrode 120 by the controlling unit. Next, measure the charge holding capacitor circuit by an analog to digital converter to obtain an initial signal. Through a third debouncing period after the measuring process is finished, the controlling unit determines whether to adjust the measuring frequency of an uncertain value for the switching mode based on the back-end filter (not shown); in other words, from the starting process to the loop process.

Step S110: conduct a measuring cycle by the controlling unit, which means it is entering the loop process. As in FIG. 3A, the flowchart of the measuring cycle S110 includes the steps S111 to S115.

Step S111: The controlling unit drives the driving circuit to maintain the initial voltage during the S107, or to provide the first voltage for the driving electrode 110, or to switch the second voltage to the driving electrode 110 according to the switching mode. In a preferred embodiment of the present invention, the initial voltage is any voltage above 0, the first voltage includes 0V and any voltage below 5V, the second voltage includes 18V and any voltage above 5V. In step S111, the controlling unit decides the switching mode based on the back-end filter (not shown) according to S109.

Step S112: The controlling unit controls that the sensing electrode 120 is coupled with the charge holding capacitor circuit.

Step S113: The electric charges on the driving electrode 110 and the sensing electrode 120 remains stable through a fourth debouncing period after the balance of potential is completed. The fourth debouncing period is longer than the second debouncing period in the embodiment of the present embodiment.

Step S114: The charge holding capacitor circuit disconnects with the sensing electrode 120 by the controlling unit. Next, an object signal is obtained by measuring the charge holding capacitor circuit 220 via an analog to digital converter 250.

Step S115: Through the third debouncing period after the measuring is finished, the controlling unit determines whether to adjust the switching mode based on the back-end filter proceeding to the next step. S105 is the result of the controlling unit based on S104. The back-end filter determines whether to change the switching mode, so that the driving electrode 110 continually remains on the first voltage when S120 repeats S111 of the measuring cycle in S110; or the driving electrode 110 continually remains on the second voltage; or the driving electrode 110 continually remains on the first voltage of several times after remaining on the second voltage of several times; or the driving electrode 110 continually remains on the second voltage of several times after remaining on the first voltage of several times; or the driving electrode 110 remains on the first voltage and the second voltage in turn. The changing of the first voltage and the second voltage depends on the back-end filter.

Go to step S120 in FIG. 3: repeat the measuring cycle in step S110 to obtain a plurality of object signals. The repeating times are odd in the embodiment of the present invention. If there is a need to cease the measuring cycle S110, which also means preparing from the loop process to the ending process, S115 in measuring cycle S110 is omitted and the last measuring cycle S110 is conducted before go to step S120.

Step S121: Proceed to the ending process. The process of the object measurement is ended as the driving electrode 110 and the sensing electrode 120 are converted to the grounding state.

Go back to step S2 in FIG. 2: conduct a liquid measurement by the controlling unit, and the liquid measurement comprises: driving one or a part of the sensing electrodes 120 to the first voltage; and, measuring electrical changes of the other sensing electrodes 120, which are not driven, by an analog-to-digital converter to obtain a liquid signal. In a preferred embodiment, a process of debouncing period is though after or before conducting the liquid measurement, to make sure the residual charges on the sensing electrode 120 is released so the liquid measurement can be steady conducted.

Step S3: determine whether the value of the liquid signal is greater than a first default value or less than a second default value by the controlling unit, wherein the first default value is larger than the second default value.

Figures 4, 5:
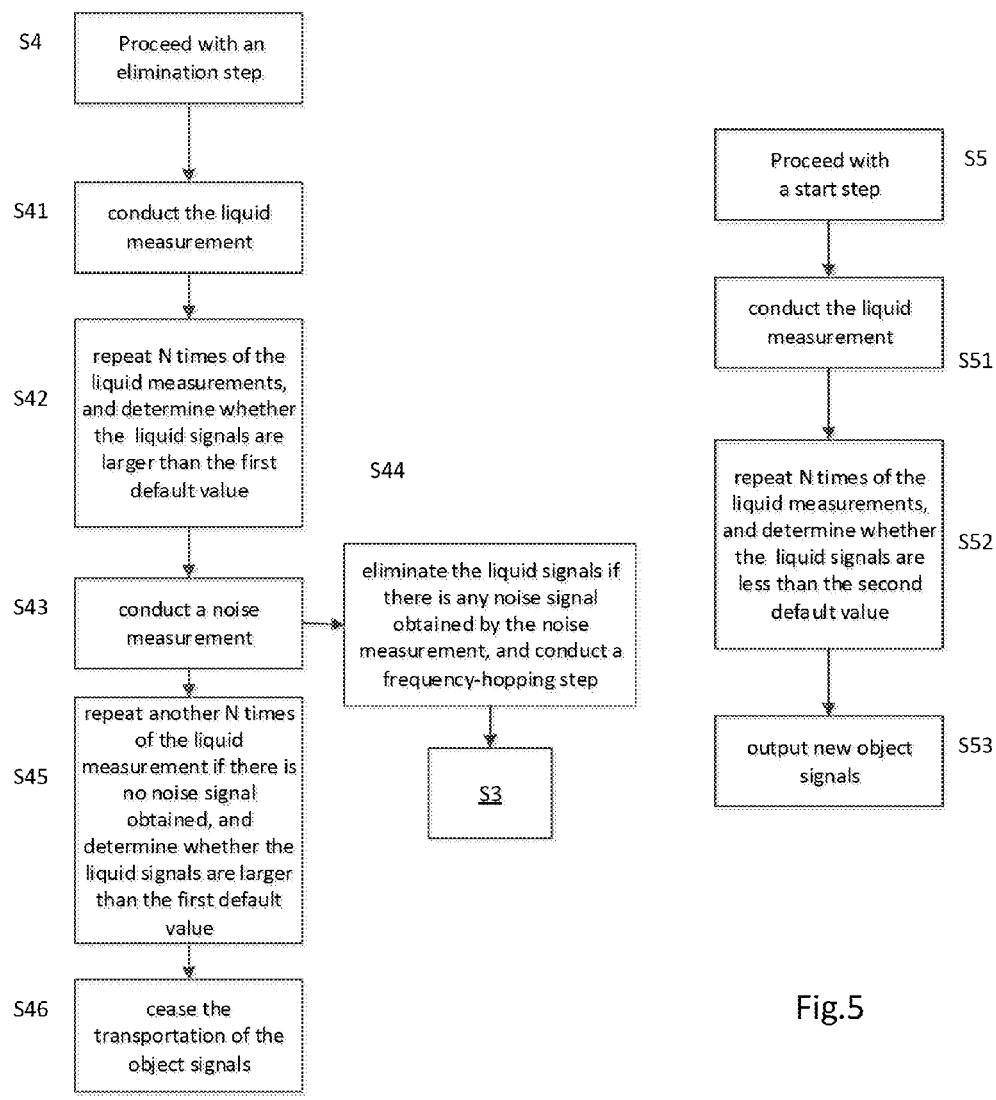
FIG. 4 and FIG. 5 respectively depict flow charts of an elimination step and a start step according to an embodiment of the present invention.

Step S4: Proceed with an elimination step if the value of the liquid signal is greater than the first default value, which means there may be any liquid such as water presenting on the surface of the touch panel. The object signals obtained in the step S1 are eliminated in this step. Please refer to FIG. 4, the elimination step includes the following.

Step S41: drive one or a part of the sensing electrodes 120 to the first voltage for conducting the liquid measurement.

Step S42: repeat N times of the liquid measurement to obtain a plurality of liquid signals, and determine whether the plural liquid signals are larger than the first default value.

Step S43: conduct a noise measurement if the liquid signals are larger than the first default value.

Step S44: after S43, eliminate the liquid signals if there is any noise signal obtained by the noise measurement, and conduct a frequency-hopping step by the controlling unit. Re-conduct the liquid measurement to obtain a plurality of new liquid signals according to the frequency of the frequency-hopping step. Back to step S3 in FIG. 3, determine whether the value of the new liquid signal is greater than the first default value or less than the second default value by the controlling unit.

Step S45: after S43, repeat another N times of the liquid measurement by the controlling unit if there is no noise signal obtained by the noise measurement to obtain the number N of new liquid signals. Then, determine whether the value of the liquid signals are larger than the first default value.

Step S46: if the value of the number N of the new liquid signals obtained in S45 are larger than the first default value, cease the transportation of the object signals obtained in previous steps to a host, which means that the object signals are eliminated.

Go to step S5: Proceed with a start step to restart the object measurement if the value of the liquid signal is less than the second default value, which means that there is no liquid presenting on the surface of the touch panel, or user wipes off the surface of the touch panel so the elimination step is relived. Please refer to FIG. 5, the start step includes the following.

Step S51: drive one or a part of the sensing electrodes 120 to the first voltage for conducting the liquid measurement.

Step S52: repeat N times of the liquid measurement to obtain a plurality of liquid signals, and determine whether the plural liquid signals are less than the second default value.

Step S53: restart the object measurement to output plural new object signals to the host if the liquid signals are less than the second default value.

Finally, the initial signal obtained in S109 and several object signals obtained in the following steps cannot be used alone as noise is included, thus, it's impossible to tell the touch signal of the object. A usable touch signal is obtained by handling the values above via the controlling unit.

In a preferred embodiment, the number of conducting the object measurement of step S1 in FIG. 2 is greater than the number of conducting the liquid measurement of step S2. The timing for conducting the liquid measurement is for example one time of the liquid measurement is conducted per the process of conducting N (N=32) times of the object measurement; or, one time of the liquid measurement is conducted per the process of conducting four times of the object measurement when there may be any liquid signals.

The invention provides a plurality of object signals in different modes as the measuring cycle is conducted rapidly and gets better touch signal via a plurality of values filtering the noise. The object identification method of the present invention is provided for avoiding to mistake a liquid signal for an object signal. By inserting a liquid measurement into a cycle of object measurement, the object signals is eliminated from the obtained signals when a liquid signal is confirmed. An elimination step is proceeded until there is no more liquid signal, and a start step is proceeded after that. Further, a process of debouncing period is though after or before conducting the liquid measurement, to make sure the residual charges on the sensing electrode is released so the liquid measurement can be steady conducted.

What is claimed is:
1. An object identification method of touch system, the touch system having at least one driving electrode and at least one sensing electrode, the object identification method comprising:

Initializing both the driving electrode and the sensing electrode to a grounding state;
coupling the sensing electrode to a charge holding capacitor circuit;
switching the sensing electrode to a floating state;
charging the sensing electrode by the charge holding capacitor circuit after completing charging the charge holding capacitor circuit;
switching the driving electrode to an initial voltage;
disconnecting the charge holding capacitor circuit and the sensing electrode after the balance of potential between the charge holding capacitor circuit and the sensing electrode is completed, and measuring the charge holding capacitor circuit by the analog to digital converter to obtain an initial signal;
repeating an object measurement to obtain a plurality of object signals;
conducting a first liquid measurement, the first liquid measurement comprising:
 driving one or a part of the sensing electrodes to a first voltage; and,
 measuring electrical changes of the other sensing electrodes, which are not driven, by an analog-to-digital converter to obtain a first liquid signal;
determining whether the value of the first liquid signal is greater than a first default value or less than a second default value, wherein the first default value is larger than the second default value;
proceeding with an elimination step if the value of the first liquid signal is greater than the first default value, the elimination step comprising:
 repeating a second liquid measurement to obtain a plurality of second liquid signals;
 conducting a noise measurement if the second liquid signals are greater than the first default value;
 repeating a third liquid measurement to obtain a plurality of third liquid signals if there is no noise signal obtained by the noise measurement, and determining whether the value of third liquid signals are greater than the first default value; and
 eliminating the object signals if the value of the third liquid signals are greater than the first default value; and
proceeding with a start step if the value of the first liquid signal is less than the second default value, the start step comprising:
 repeating the second liquid measurement to obtain a plurality of the second liquid signals; and
 starting the object measurement to output the object signals if the second liquid signals are less than the second default value.

2. The object identification method according to claim 1, wherein the number of conducting the object measurement is greater than the number of conducting the first, second and third liquid measurement.

3. The object identification method according to claim 1, further comprising:
 a process of calculating the initial signal and the object signals by a controlling unit to obtain a touch signal.

4. The object identification method according to claim 1, wherein the object measurement is conducted comprising:
 switching the driving electrode to a first voltage or a second voltage according to a switching mode, the switching mode depends on a back-end filter, wherein the first voltage is less than the second voltage;
 coupling the sensing electrode to the charge holding capacitor circuit; and
 disconnecting the charge holding capacitor circuit and the sensing electrode after the balance of potential is completed, and measuring the charge holding capacitor circuit by the analog to digital converter to obtain one of the object signals.

5. The object identification method according to claim 1, further comprising:
 a process of debouncing period after or before conducting the liquid measurement.

6. The object identification method according to claim 1, further comprising:
 eliminating the second liquid signals if there is any noise signal obtained by the noise measurement;
 conducting a frequency-hopping step;
 conducting another liquid measurement to obtain a plurality of new liquid signals according to the frequency of the frequency-hopping step; and,
 determining whether the value of the new liquid signal is greater than the first default value or less than the second default value.

7. The object identification method according to claim 1, wherein the first voltage is from 0V to 5V.

8. The object identification method according to claim 1, wherein the initial voltage is any voltage above 0V.

9. The object identification method according to claim 4, wherein the second voltage is from 5V to 18V.

* * * * *